3,518,046
METHOD AND APPARATUS FOR THE DESTRUCTION OF AIRBORNE MICROORGANISMS WITHIN A ROOM
Daniel J. Cicirello, 6406 Tracy St., Little Rock, Ark. 72206
Filed Sept. 16, 1968, Ser. No. 759,960
Int. Cl. A61l 9/00; B01d 51/10; H01j 37/00
U.S. Cl. 21—53                                                   14 Claims

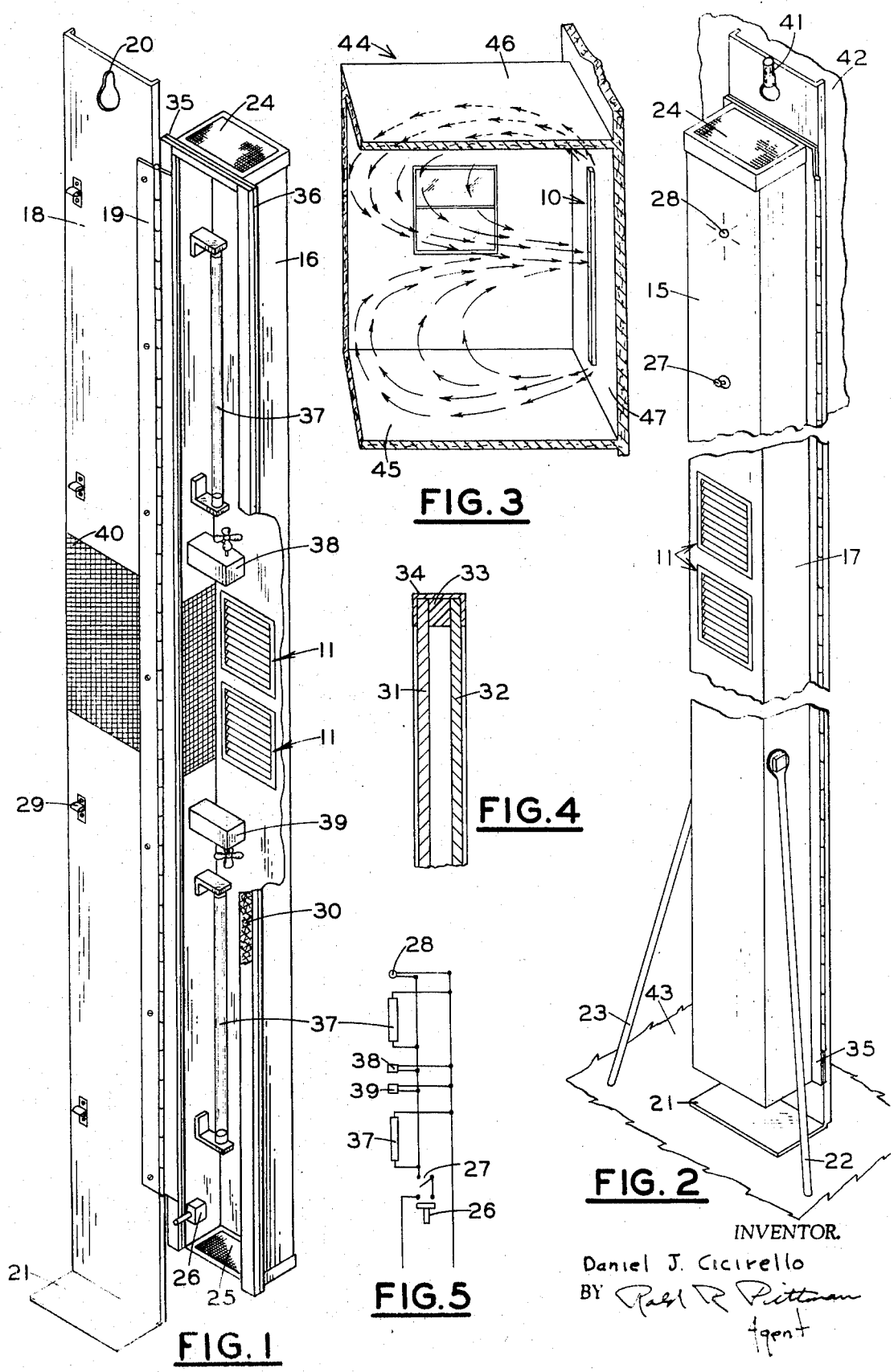

ABSTRACT OF THE DISCLOSURE

A method and apparatus for the prevention of the dissemination of infectious diseases by human carriers within occupied rooms by circulating the environmental air through an upright tube having a height slightly less than the height of the room, the tube containing a pair of coextensive germicidal radiators effective to destroy airborne pathogenic microorganisms passing therealong. Room air is discharged from each end of the tube after being taken into the tube through an intake located at about one-half of the height of the room, the stratum of air at this elevation having the densest population of viable airborne particulates.

---

This invention relates generally to a method and apparatus for the sterilization of air and the surfaces contacted thereby within a room, and more particularly to apparatus having a tubular housing within which the most infected environmental air within a room is caused to move in such close association with germicidal radiation sources that effective destruction of airborne pathogenic microorganisms is assured.

While the invention is suitable for use with any effective tubular source of germicidal radiation, the most satisfactory known at this time from the standpoint of economy and effectiveness is radiation from commercially available and generally well known ultraviolet lamps.

The need for the asepsis of environmental air in food and pharmaceutical manufacturing areas, hospitals, clinics, nurseries and civil defense shelters has long been recognized, and many air purification devices and systems utilizing ultraviolet radiation have been heretofore described which are specifically applicable to these situations. The present invention is not only generally adapted to the above situations, but is also particularly suitable for home use, because of its simple construction, accessibility for maintenance and small space requirement, along with a weight sufficiently light as to permit the structure to be hung on a wall from a picture hanger.

The human carrier is a major source of epidemic diseases through the transmission from one person to another of organic matter contained in viable airborne particulates, which may be bacterial, viral or fungal. Public buildings, schools, theaters, aircraft and other public transportation enclosures are areas from which contaminated atmospheres are likely to be inspired, and individuals leaving such areas may carry pathogenic organisms in their respiratory passages as well as on their clothing. In addition, a human being may be a source of infectious organisms, as well as a carrier, notably of the several species and strains of the genus Staphylococcus, and it is at least doubtful that this pathogen will ever be eliminated from the human environment.

The present invention is characterized by its advantageous utilization of the fact that the most dense accumulation of airborne organisms within a room is found at an elevation about halfway between the floor and ceiling, or in terms of common building construction, at an elevation of four or five feet above the floor. This situation apparently results from the multitude of minute droplets which are expelled from the nose and mouth of humans in sneezing, coughing, talking or even breathing. Some of the larger droplets reach the floor in falling, but a large number quickly lose their moisture by evaporation to become droplet nuclei, these nuclei being composed of microorganisms and associated salts. The density-size relationship of these nuclei is such that they will remain suspended indefinitely in air in a manner similar to tobacco smoke, and it is believed their concentration in the air stratum described results from their initial discharge from the respiratory openings at or near this elevation.

Accordingly, it is an object of the present invention to provide a method and apparatus for sterilizing air within a room the effectiveness of which is augmented by directing air from the most highly contaminated stratum in the room to a germicidal radiator for its sterilization.

The selection of this stratum requires that the intake opening into the housing of the apparatus be disposed near eye level, at which level ultraviolet rays could cause serious physical damage to occupants of the room, and for this reason it is an object of the invention to provide an air intake construction which is impervious to ultraviolet light.

Another object is the provision of an inconspicuous room air sterilizing apparatus the housing of which is a light weight thin wall metal tube of small cross section, suitable for hanging on a room wall.

A further object is the provision of an air purifier in which tubular germicidal radiation sources are disposed coextensively within a tube having a large ratio of internal surface to cross sectional area, such that all environmental air passing through the tube moves along and in intimate association with the germicidal sources.

Another object is the provision of a radiant type tubular air sterilizer having a piano-hinged door extending over the entire length of the contained apparatus, to thereby provide ready access to the internal elements for maintenance.

A further object is to provide a tubular air purifier which in addition to destroying airborne pathogenic microorganisms also filters out nonviable particles, if desired.

Other objects and advantages will be apparent from the specification and claims herewith, and from the accompanying drawing, wherein:

FIG. 1 is a rear view of the apparatus of the invention, shown with the door portion of the tubular container open;

FIG. 2 is a front view of the apparatus;

FIG. 3 illustrates some air currents typical of the operation of the apparatus when suspended from the wall of a room;

FIG. 4 is a fragmentary section showing some detailed construction of the air intake; and FIG. 5 is a wiring diagram of the apparatus.

Referring in more detail to the drawing, it may be seen that the upstanding elongate tube which constitutes the housing of the apparatus includes the channel-shaped member formed by the front panel portion 15, the latch side panel portion 16 and the hinge side panel portion 17, along with the outwardly extending side flanges 35 and 36. The rear wall panel and door portion 18 of the tube is joined to the side flange 35 of the hinge side panel 17 by means of the piano hinge 19, so that the door portion 18, when swung to the open position, provides ready access to all of the internal members of the apparatus. A resilient gasket 30 is fastened to and extends along the outer surface of the side panel flanges 35 and 36 to form a light-tight joint therealong when the door portion 18 is closed, and the door latch members 29 engage complementary latch members (not shown) for latching the door in the closed position.

The environmental air inlet louver assembly 11 passes through the front panel portion of the tube at an elevation about midway of the height of the tube; the height of the tube normally being only slightly less than the height of the ceiling of the room in which it is to be used. As shown at FIG. 4, each air intake comprises a pair of opposed spaced louvers the fins 31 and 32 of which slope respectively downward from the panel along parallel planes convergent on a plane midway between the fins. The louvers are held against the peripheral spacer by the marginal retaining member 34. This construction prevents leakage of ultraviolet light through the air inlets, which is necessary for the reason that such light may cause severe damage, in particular to the eyes, of occupants of the room. As an aid to the further restriction to the escape of ultraviolet rays, the nonreflective surfaces 40 are provided opposite and along the respective sides of the louvered opening.

At the upper and lower ends of the tube, and extending completely over each end, are the upper and lower air filters 24 and 25. These filters may or may not be desirable, depending upon the associated environment, and if used, may have a porosity best adapted to the activities carried on in the room, varying from millipore to very coarse.

Upper and lower germicidal ultraviolet lamps 37 are mounted along an inner side wall of the tube above and below the air inlet assembly 11, the upper lamp being disposed above the upwardly blowing fan 38 and the lower lamp below the downwardly blowing fan 39, the respective fans being mounted on an inner side of the tube between the air inlet assembly 11 and the respective lamps.

Two installation arrangements are shown herein: (1) by downward suspension from its upper end, removably engaged with a wall hanger or, alternately, (2) standing upright from its lower end. For wall installation of the apparatus, a centrally located keyhole opening 20 is provided through an upwardly extended portion of the door panel 18; the upper end portion appearing in FIG. 2 shows the apparatus suspended along a wall 42 from a wall hanger 41. For installation in a standing position, a lower end portion of the door panel 18 extends first downwardly and then inwardly to provide the foot 21, and the downwardly extending legs 22 and 23, joined to the respective side portions above the foot, extend outwardly and forwardly to hold the tube in the upright position; the lower end portion in FIG. 2 shows the apparatus standing upright on the floor 43. Any other installation arrangement allowing free access to the air passageways may of course be used; more than one unit in a room may be desirable under certain conditions.

A normally open door-operated switch 26 precludes energizing the radiation sources unless the door panel 18 is closed; an off-on manually operable switch 27 and a signal or monitor light 28 are mounted on the front panel 15. FIG. 5 indicates the circuit arrangement.

In FIG. 3 the invention 10 is shown hung on a wall 47 of a room 44, extending vertically along the wall from a point near the floor 45 to a point near the ceiling 46. The arrows of FIG. 3 indicate generally the air circulation path resulting from operation of the apparatus. As here shown, environmental air enters the apparatus from the room through the centrally disposed intake 11, one portion of the entering air being moved upwardly alongside the upper ultraviolet lamp by the fan 38, and the remaining and substantially equal portion is concurrently moved downwardly alongside the lower ultraviolet lamp by the fan 39. After sterilization by the ultraviolet radiation, the air is discharged back into the room through the upper and lower ends of the tube.

The tube may be conveniently formed from thin sheet stainless steel, with the internal surface, except for that portion adjacent to the air inlet, highly polished to reflect ultraviolet radiation. The small cross-sectional area of the tube relative to its internal surface assures that all air moved by the fans passes along the lamps in close proximity thereto, thus assuring effective destruction of any viable airborne particles present in the passing air, based on the well known fact that the bactericidal efficiency of an ultraviolet source is an inverse square function of the distance from the source. As an example, in one effective physical embodiment of the invention the tube has a rectangular internal cross sectional area of 15 square inches, with an internal surface area to cross-sectional area ratio of 72.

The small size of the tube conforms to the small size fan most suited for moving the air at a rate best adapted for its sterilization; for example, a 10 blade, 2½ inch diameter fan driven by a $\frac{1}{250}$ horsepower motor is one suitable air moving device.

It is here noted that complete sterilization of the air on its first pass through the apparatus is not a critical matter, for the reason that the room air will in any event become sterile as it is continuously circulated through the sterilizing zones within the tube. If the filters are used with the apparatus, both viable and nonviable particulates are concurrently removed from the environmental atmosphere.

The construction herein disclosed is essentially a portable electrical appliance, especially suited, because of its light weight, internal accessibility and small space requirement, for use in homes as well as any other location wherein any airborne disease-causing bacteria or microorganisms may be carried or produced by the occupants.

What I claim as my invention, and desire to secure by Letters Patent of the United States is:

1. Apparatus for providing an air current of substantially sterile air within a room, said apparatus comprising an upstanding elongate tube of uniform cross section having mounted therein coextensive longitudinally spaced upper and lower tubular sources of germicidal ultraviolet radiation, an ultraviolet-impervious air inlet disposed at an elevation between said sources of radiation, an upper air outlet at the upper end of said tube and a lower air outlet at the lower end of said tube, and fan means within said tube associated with each tubular radiation source effective to move environmental air into said air inlet and divergently alongside each tubular radiation source and thence to concurrently discharge through the upper end outlet and the lower end outlet.

2. The apparatus in accordance with claim 1, including air filters mounted on said tube and extending over the respective air outlets in the path of discharge of the air from the respective ends of said tube.

3. The apparatus as claimed in claim 1, in which the ultraviolet-impervious air inlet comprises a pair of opposed spaced louvers the fins of which extend in parallel planes converging along a vertical plane positioned between said opposed spaced louvers.

4. The apparatus as defined in claim 1, in which said fan means includes a first fan disposed for moving air upwardly along the upper radiation source and a second fan for moving air downwardly along the lower radiation source.

5. The apparatus as defined in claim 1, wherein the ratio of the area of the internal surface of the tube to the area of the cross section of the tube is not less than 72.

6. The apparatus as defined in claim 5, in which the internal surface of the tube along each tubular radiation source is a highly polished reflector of ultraviolet light.

7. The apparatus as defined in claim 5, in which the internal surface of the tube alongside the air inlet is a nonreflector of ultraviolet light.

8. The apparatus as claimed in claim 5, wherein the tube is rectangular in cross section.

9. The apparatus as claimed in claim 6, in which the rectangular tube has a front panel portion, a pair of side panel portions and a rear panel door portion swingably joined to one side portion panel by a piano hinge for full length swingable movement of the door portion between open and closed position, and wherein means are included for latching the door portion of the tube in the closed position.

10. The apparatus as defined in claim 9, in which an upper portion of the rear panel door portion extends upwardly beyond the other portions of the tube, and the upper end portion has an opening for passage therethrough of a wall hanger, to thereby suspend the apparatus from the hanger and along the wall.

11. The apparatus as defined in claim 9, wherein a lower end portion of the rear panel door portion extends first downwardly and then inwardly when the door portion is in the closed position to provide a foot portion from which the tube may stand, and leg means joined to the lower end portion of said tube and extending outwardly therefrom for stabilizing the tube in the upright standing position.

12. The apparatus as claimed in claim 9, wherein switch means is connected to deenergize the radiation sources when the door portion is moved to the open position.

13. In a method for the sterilization of air within a room having walls, a floor and a ceiling by continuously circulating the environmental air through an elongate tube in which the air is sterilized by exposure to germicidal radiation, the improvement which comprises suspending the tube vertically along one of the walls and moving the environmental air into the tube from the air stratum positioned substantially midway between the floor and ceiling of the room and discharging one portion of the sterilized air adjacent to the floor of the room and the remaining portion of sterilized air adjacent to the ceiling of the room.

14. The method recited in claim 13, wherein the germicidal radiation is supplied by an ultraviolet source.

References Cited

UNITED STATES PATENTS

| | | | |
|---|---|---|---|
| 2,350,091 | 5/1944 | Bergman | 21—102 XR |
| 2,359,057 | 9/1944 | Skinner | 250—43 |
| 2,449,681 | 9/1948 | Wilson | 21—74 XR |
| 2,553,711 | 5/1951 | Jackson | 21—74 |
| 2,638,644 | 5/1953 | Rauhut | 21—53 XR |
| 2,681,061 | 6/1954 | Modell | 128—172.1 |
| 3,011,230 | 12/1961 | Potapenko | 21—74 |
| 3,071,828 | 1/1963 | Cornell | 21—74 |
| 3,100,679 | 8/1963 | Kritzer | 21—74 |
| 3,105,733 | 10/1963 | Potapenko | 21—74 |
| 3,107,974 | 10/1963 | Potapenko | 21—53 |
| 3,347,025 | 10/1967 | Wiley | 21—74 XR |

MORRIS O. WOLK, Primary Examiner

B. S. RICHMAN, Assistant Examiner

U.S. Cl. X.R.

21—54, 74, 102; 55—279; 62—78, 264; 250—43, 46, 48